H. L. JOHNSON.
WRAPPING AND SEALING MACHINE.
APPLICATION FILED SEPT. 22, 1916.
1,266,686.
Patented May 21, 1918.
9 SHEETS—SHEET 5.
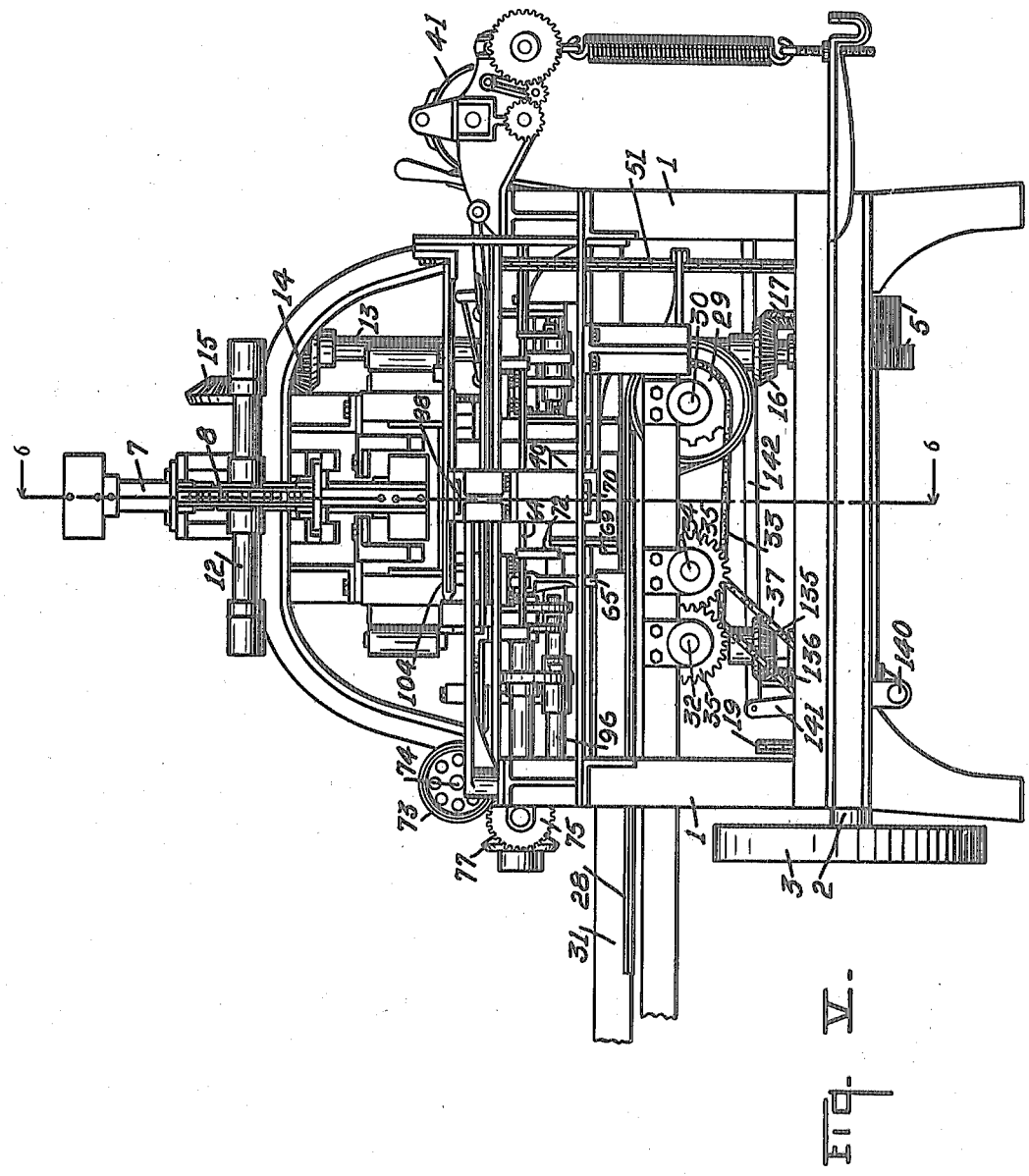
FIG. V.
WITNESSES:
P. W. Pomeroy
Lenn Gilman
INVENTOR
Harry L. Johnson.
BY
Chappell & Earl
ATTORNEYS

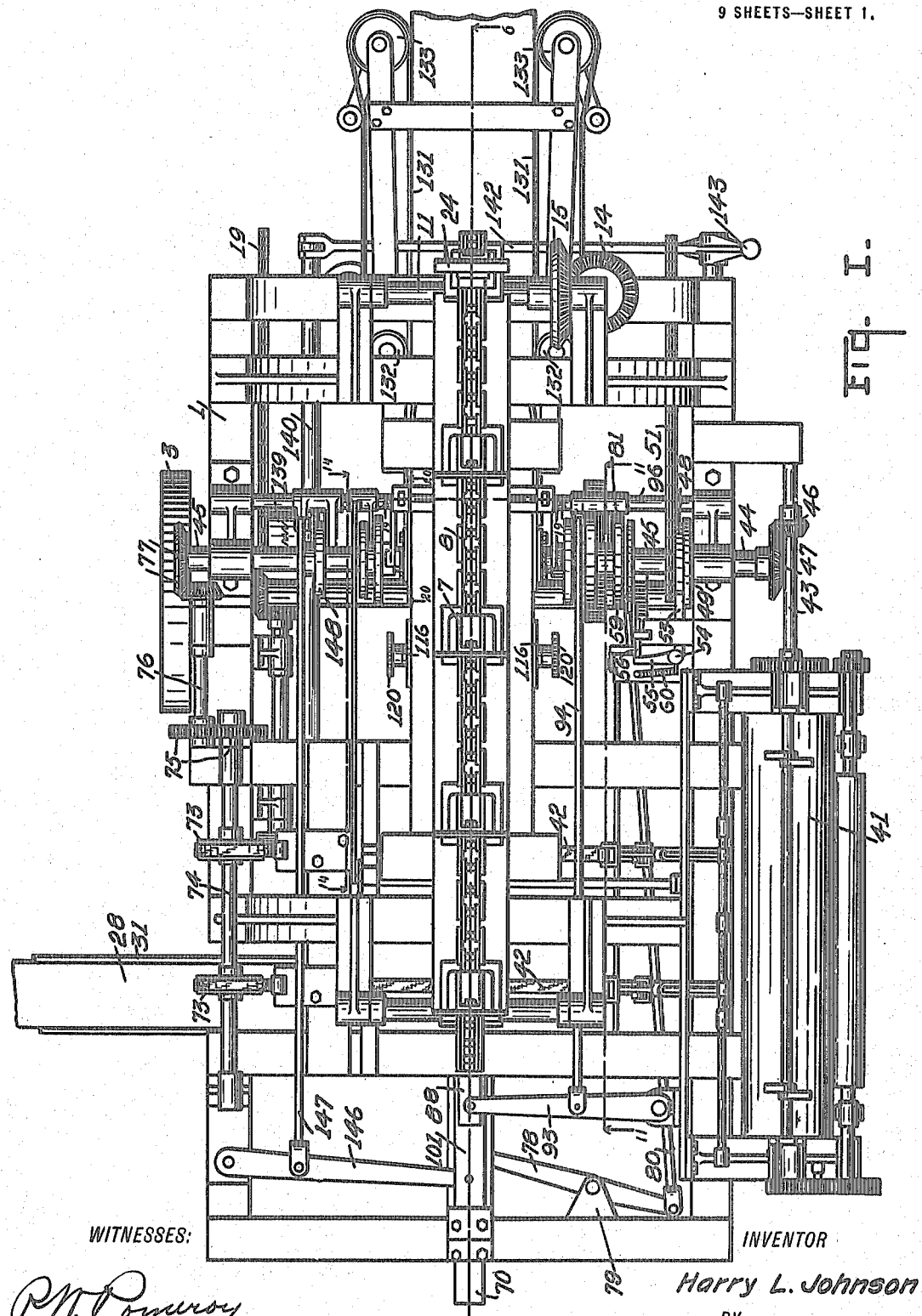

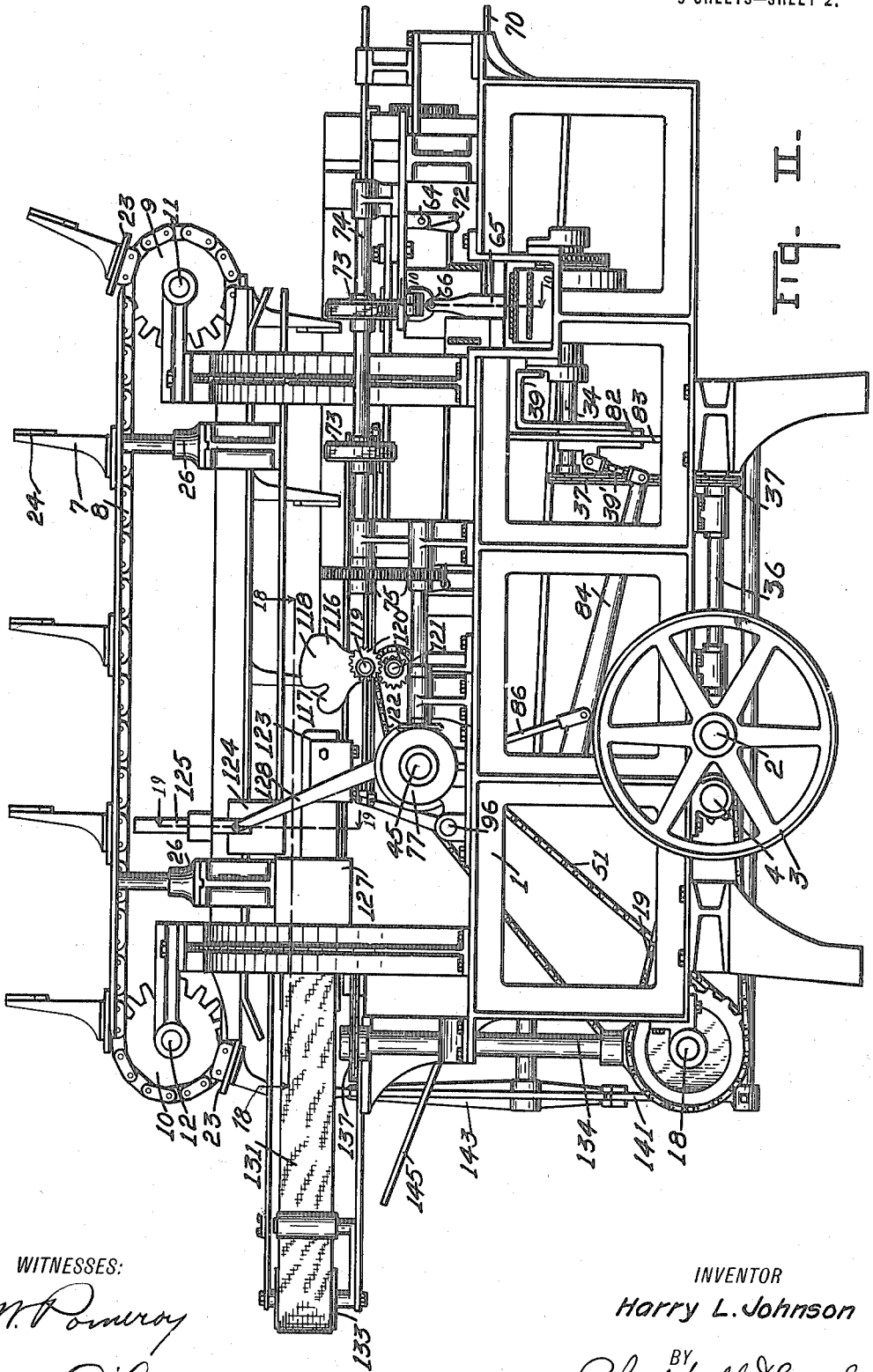

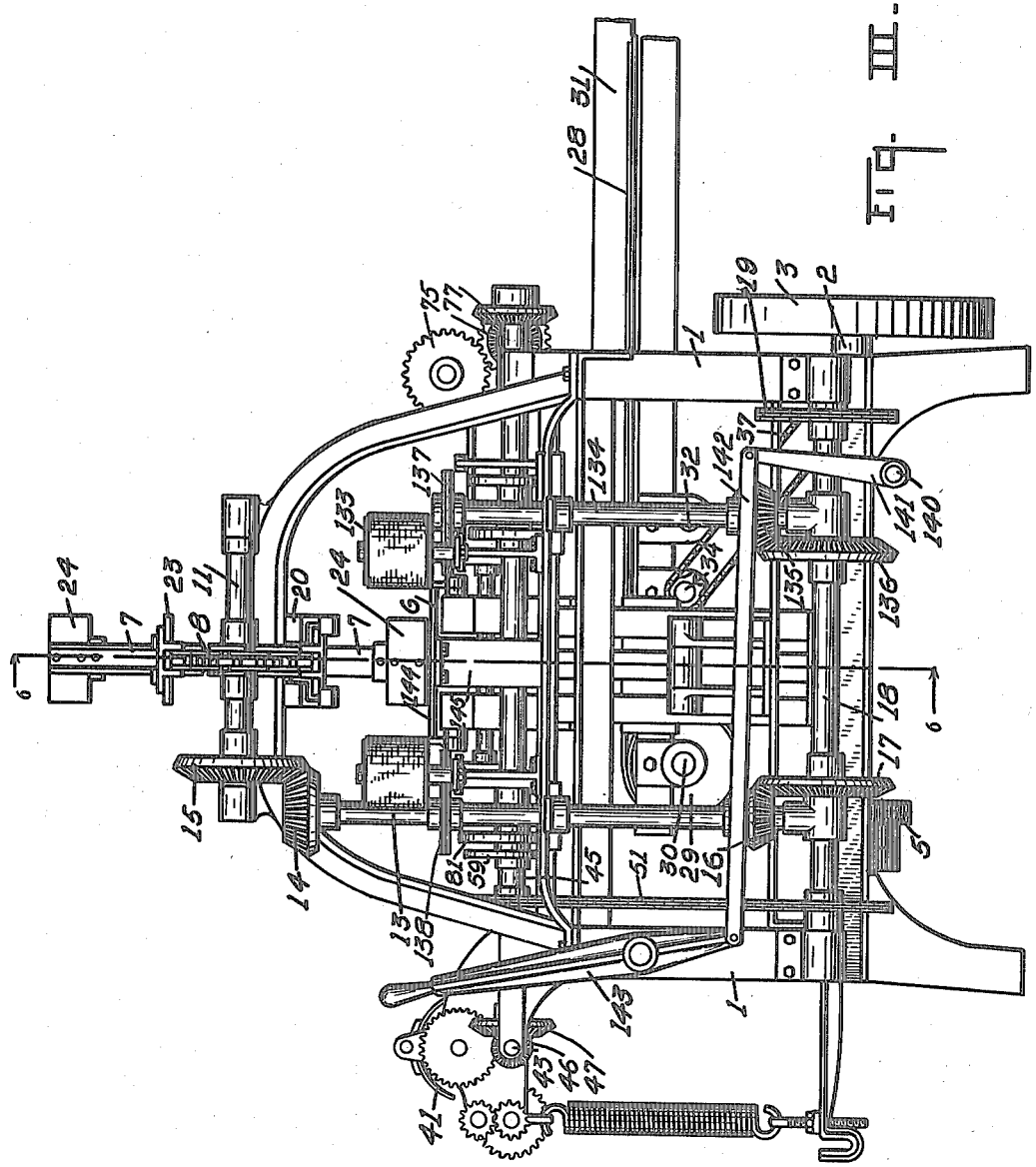

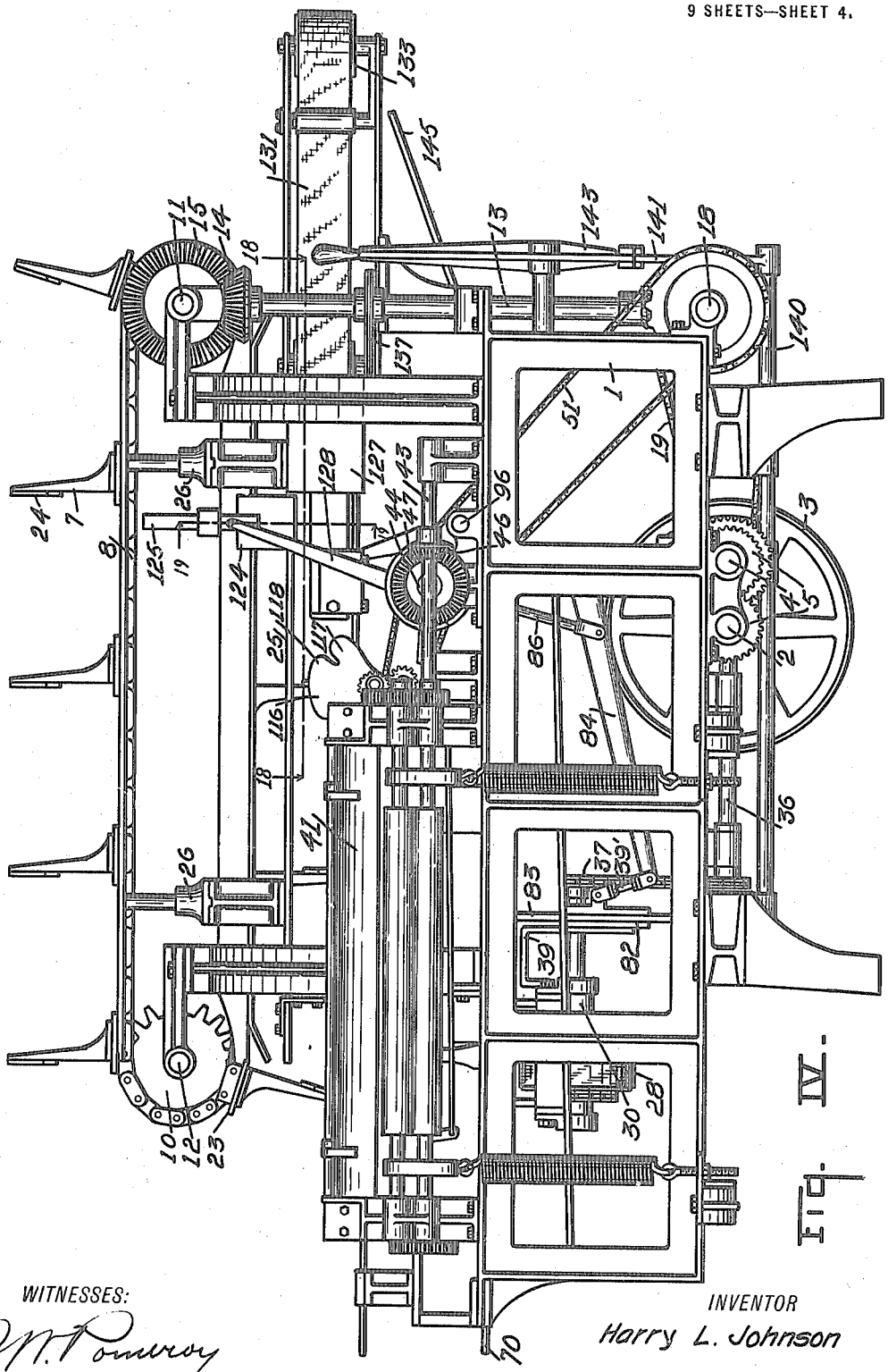

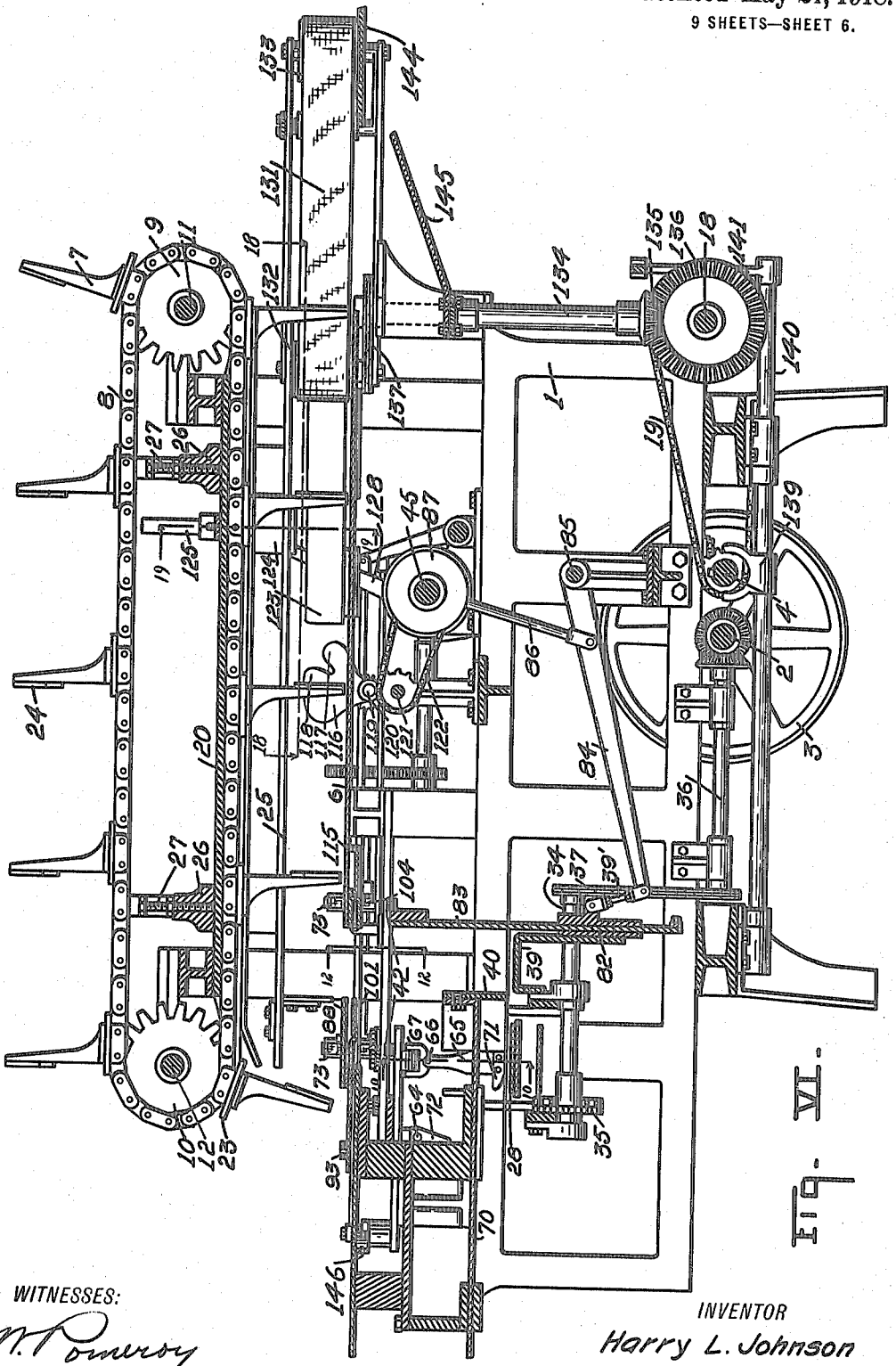

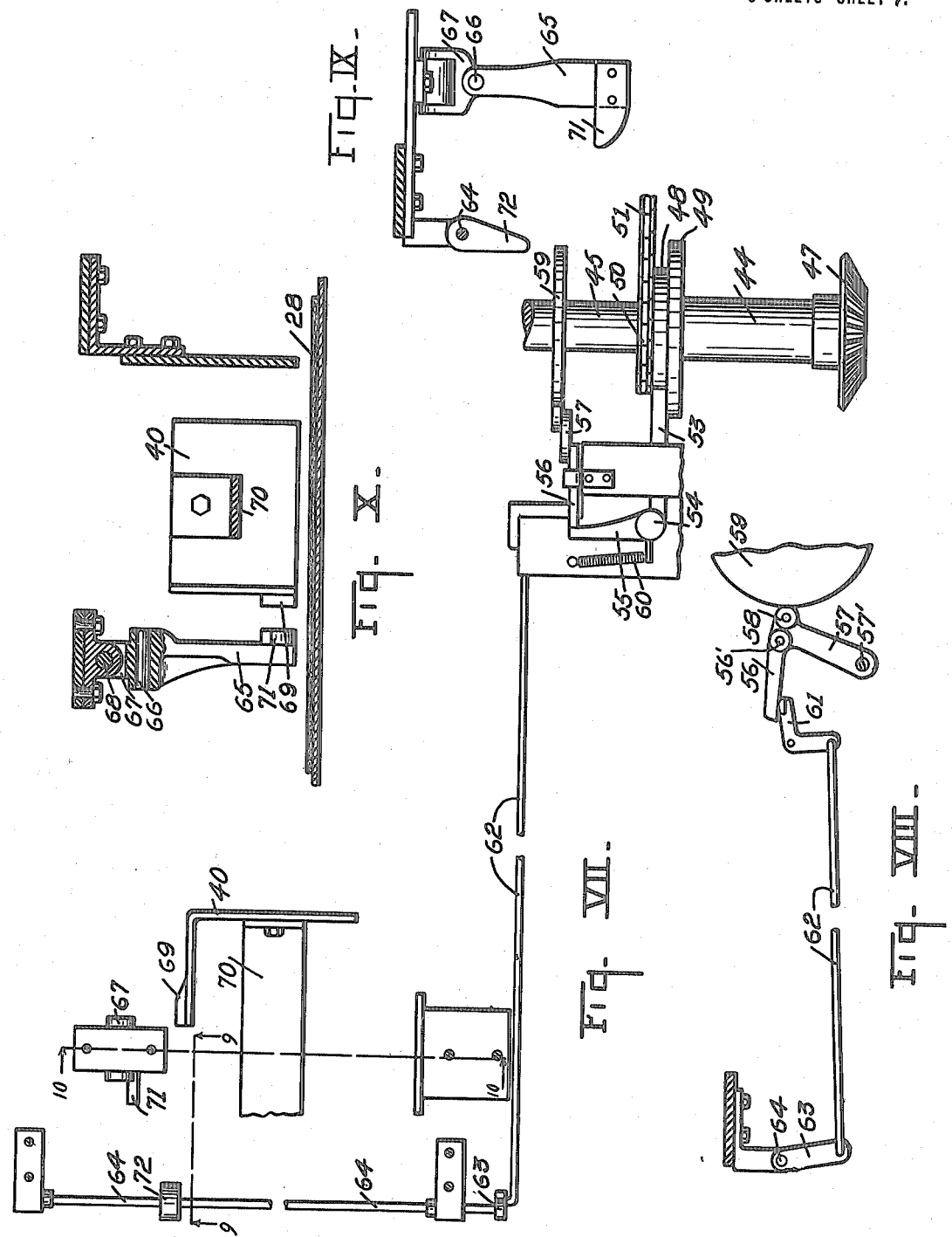

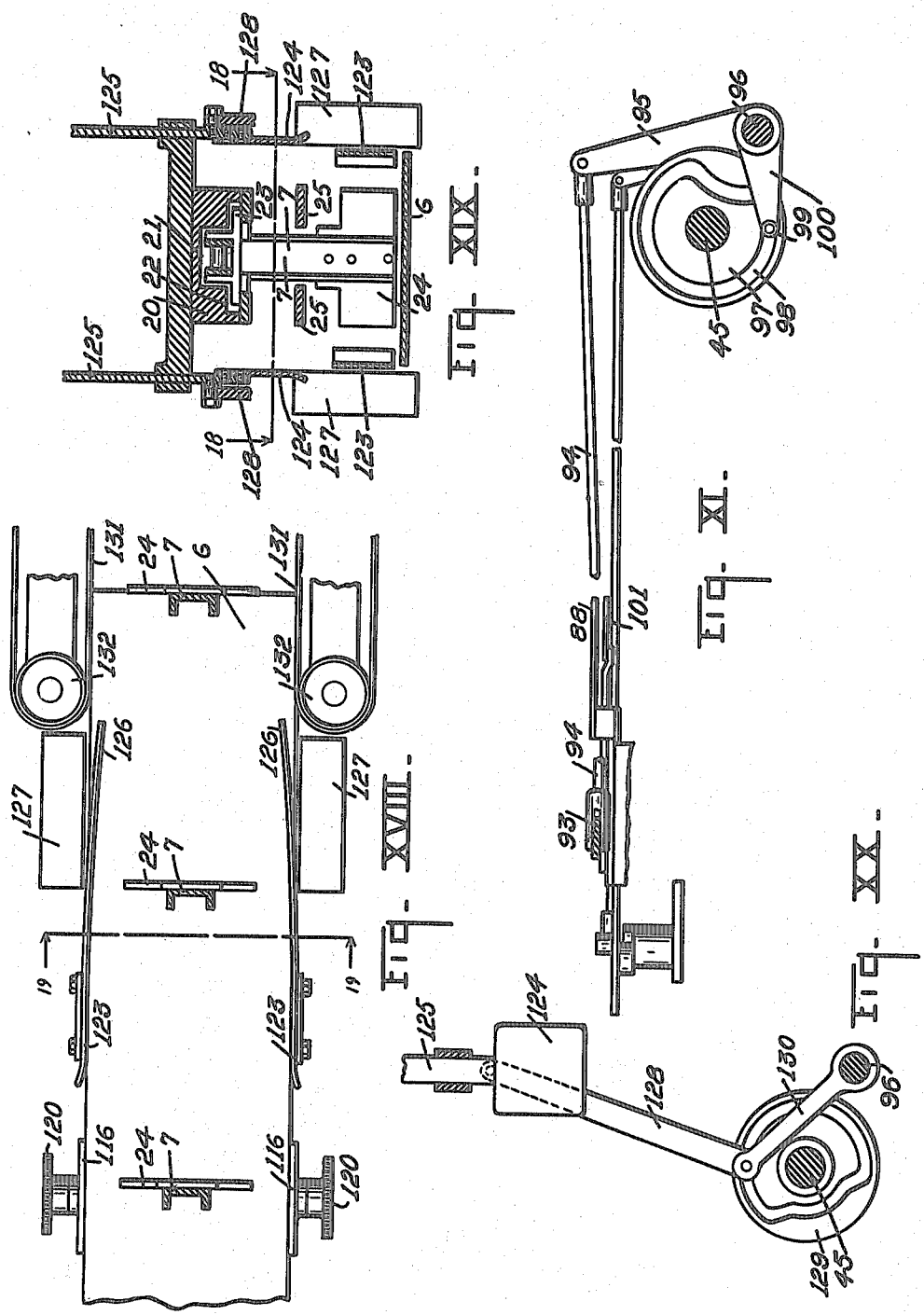

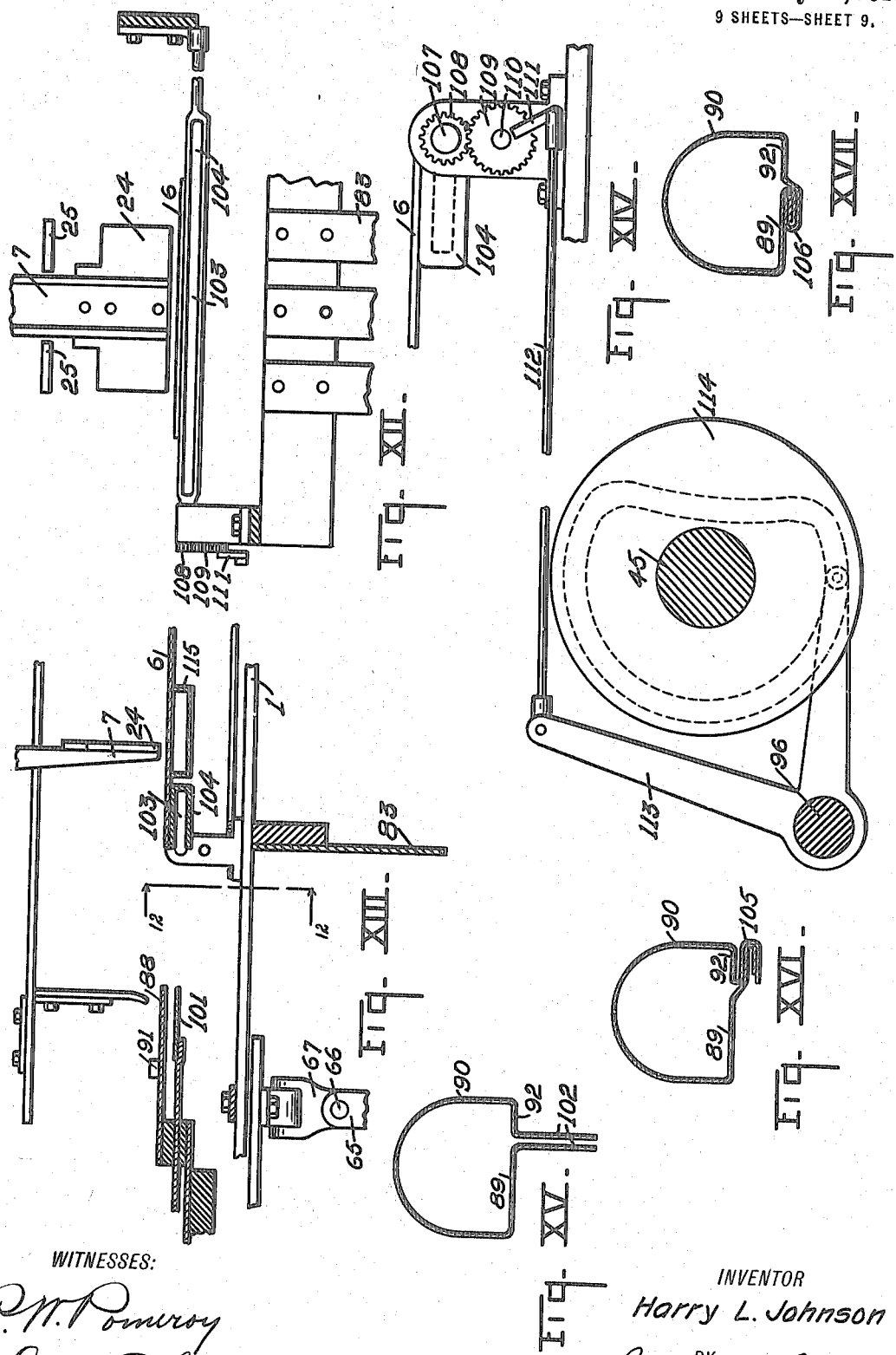

UNITED STATES PATENT OFFICE.

HARRY L. JOHNSON, OF BATTLE CREEK, MICHIGAN, ASSIGNOR TO JOHNSON AUTOMATIC SEALER CO., LTD., OF BATTLE CREEK, MICHIGAN.

WRAPPING AND SEALING MACHINE.

1,266,686.    Specification of Letters Patent.    Patented May 21, 1918.

Application filed September 22, 1916. Serial No. 121,578.

*To all whom it may concern:*

Be it known that I, HARRY L. JOHNSON, a citizen of the United States, residing at Battle Creek, county of Calhoun, State of Michigan, have invented certain new and useful Improvements in Wrapping and Sealing Machines, of which the following is a specification.

This invention relates to improvements in wrapping and sealing machines.

My present improvements are in some respects an adaptation of and an improvement upon the structure shown in my application for Letters Patent, filed Jan. 30, 1915, Ser. No. 5257, certain features of the mechanism there shown and described in detail being used in the mechanism shown herein. My present improvements are well adapted for embodiment in machines for sealing irregular articles, such as loaves of bread, and I have shown them as I have embodied them in a machine for that purpose. My improvements are, however, desirable for and readily embodied in structures designed for the wrapping and sealing of boxes and cartons.

The main objects of this invention are:

First, to provide an improved automatic wrapping and sealing machine.

Second, to provide in a wrapping and sealing machine an improved feed mechanism for delivering the articles to be wrapped to the paper.

Third, to provide an improved wrapping mechanism.

Fourth, to provide an improved wrapping machine which is of large capacity and at the same time one which is compact in structure and durable in use.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a plan view of a combined wrapping and sealing machine embodying the features of my invention.

Fig. II is an elevation of the left side of the machine.

Fig. III is a rear elevation.

Fig. IV is an elevation of the right side of the machine.

Fig. V is a front elevation.

Fig. VI is a vertical central longitudinal section on a line corresponding to line 6—6 of Figs. I, III and V.

Fig. VII is a detail plan view of the paper feed control clutch and its operating connections.

Fig. VIII is a detail side view of the paper feed clutch operating mechanism.

Fig. IX is a detail section thereof on a line corresponding to line 9—9 of Fig. VII.

Fig. X is a detail vertical section on a line corresponding to line 10—10 of Figs. II, VI and VII.

Fig. XI is a detail section on a line corresponding to line 11—11 of Fig. I, showing details of the wrapper folding mechanism.

Fig. XII is a detail section on a line corresponding to line 12—12 of Figs. VI and XIII, showing further details of the wrapper folding mechanism.

Fig. XIII is an enlarged detail vertical central longitudinal section showing further details of the wrapper folding mechanism.

Fig. XIV is a detail section on a line corresponding to line 14—14 of Fig. I, showing details of the wrapper folding mechanism operating connections.

Fig. XV is a sectional view illustrating the first operation in the folding of the wrapper after it has been wrapped about three sides of the article.

Fig. XVI is a sectional view of the wrapper showing the second operation.

Fig. XVII is a sectional view of the wrapper, showing the third step—the finished bottom fold.

Fig. XVIII is a detail horizontal section on a line corresponding to line 18—18 of Figs. II, IV, VI and XIX, showing details of the end folders and heat and sealing means therefor.

Fig. XIX is a detail vertical section on a line corresponding to line 19—19 of Figs. I, II, IV, VI and XVIII, showing further details of the end folders and heating means.

Fig. XX is a sectional view on a line corresponding to line 20—20 of Fig. I, showing one of the end flap folders and operating connections therefor.

In the drawing, similar reference characters refer to similar parts throughout the several views, and the sectional views are taken looking in the direction of the little arrows at the ends of the section lines.

Referring to the drawing, the main frame 1 comprises side and cross pieces arranged to provide a rigid frame and suitable supports for the operating parts. As the details of the frame form no part of this invention I do not describe the same herein.

A power shaft 2 is arranged transversely of the frame and is provided with a pulley 3. A driving shaft 4 is disposed parallel to the power shaft and connected thereto through suitable gears 5. The driving connections for the several mechanisms, with the exception of the feed conveyer, are through this driving shaft 4. These driving connections, in so far as it seems necessary to describe them, will be referred to in connection with the description of the several mechanisms, that is, the article feed, the paper feed, the wrapping, the sealing, and the delivery mechanisms, thus making clear their operation and their coacting relation to the other mechanisms.

The sealing conveyer is disposed centrally and longitudinally of the machine above the other mechanisms and comprises a conveyer way 6 along which the articles are carried by the conveyer flights 7 of the chain 8. This chain 8 is mounted above the way 6 on the sprockets 9 and 10 carried by the shafts 11 and 12, respectively. See Figs. II, IV and VI. The conveyer shaft 11 is driven from the vertical shaft 13 disposed at the rear or discharge end of the machine and provided at its upper end with a beveled gear 14 meshing with a bevel gear 15 on the shaft 11. The shaft 13 is provided at its lower end with a beveled gear 16 meshing with the gear 17 on a transverse shaft 18. This shaft 18 is connected by the sprocket chain 19 and suitable sprockets to the driving shaft 4. A way 20 is provided for the lower reach of the chain 8 so that the conveyer flights 7 are supported in proper relation to the conveyer way 6, as they are carried along above the same.

The way 20 is provided with a longitudinal channel 21 for the chain and with opposed inwardly facing grooves 22 adapted to receive the edges of the plates 23 on the flights so that the flights are held vertically while carrying the article along the way 6 (see Figs. VI and XIX). The flights 7 are provided with cross heads 24 above which are spaced bars 25 (see Fig. XIX). These bars hold the articles to the way 6. The chain way 20 is adjustably supported on brackets 26, the adjusting screws 27 being carried by the brackets (see Fig. VI).

The feed conveyer comprises the belt 28 which is disposed transversely of the machine, its inner end being supported by the pulley 29 on the shaft 30. The pulley for the outer end of the feed belt is not illustrated. The feed conveyer is provided with side bars 31, one at each side of the belt.

The shaft 30 is connected to the shaft 32 by the chain 33 and suitable sprockets (see Fig. V). The shaft 32 is connected to a shaft 34 by the gears 35. The shaft 34 is connected to a shaft 36 by the chain 37 and suitable sprockets and the shaft 36 is connected to the power shaft 2 by the beveled gears 38 (see Fig. VI). The feed conveyer 28 is disposed in a plane below the sealing conveyer, its relation being clearly shown in Fig. VI.

The articles are carried from the feed conveyer to the feed plunger 39 by the shifting plunger 40 and feed plunger 39 adapted to deliver the articles to the sealing conveyer.

The paper is automatically fed from the roll 41 and cut into sheets the desired size. The paper is delivered below the sealing conveyer by the feed belts 42. This paper feed mechanism is preferably that described in my application for Letters Patent referred to adapted to this structure and, as the details of the feed mechanism form no part of my present invention I have not illustrated or described the same in detail herein.

The automatic control for the paper feed mechanism is also the same as that shown in my said application and I will only describe such parts thereof as will make clear the coacting relation of the paper feed mechanism to the other parts of the machine. The paper feed mechanism shaft 43 is connected to the shaft 44, sleeved upon the cam shaft 45, by the beveled gears 46 and 47 (see Figs. I, III and IV). The shaft 44 is driven through a clutch mechanism comprising members 48 and 49 connecting the same to the sprocket 50 which is connected by the chain 51 to the shaft 18.

The clutch is controlled by the dog 53 pivoted at 54 and having an arm 55 projecting into operative relation with the trip 56 pivoted at 56' to the rocking lever 57 which is pivoted at 57'. The lever 57 is provided with a roller 58 coacting with the cam 59. The dog 53 is held yieldingly in engaging position by the spring 60. The trip 56 is controlled by the dog 61 operatively connected by the link 62 to the arm 63 on the rock shaft 64 (see Figs. VI, VII and VIII). This rock shaft 64 is controlled by the delivery of the articles so that the feeding of the paper takes place only when articles are being delivered to the machine by the feed conveyer. This feed controlled clutch mechanism is substantially that of my said application and therefore is not illustrated or described in full detail herein.

As the articles are delivered by the feed conveyer they engage the stop 65 which depends into the path of the articles. This stop member is pivoted at 66 upon a hanger 67, the pivot 68 of which is disposed transversely of the conveyer, while the pivot 66 is disposed longitudinally thereof, thus giving the stop a swinging movement in two directions. As the articles are carried forward by the feed belt they engage the stop 65 and swing it forwardly into position to be engaged by the trip 69 on the shifting plunger 40 (see Figs. IV, VII and X). The shifting plunger 40 is mounted on a slide 70 to reciprocate across the feed conveyer and on its return movement should the stop 65 be pressed or moved to engaging position by an article on the belt it is engaged by the trip 69 and swung on its pivot 66 bringing its armor cam 71 into contact with the arm 72 on the rock shaft 64 and through its connections described actuate the clutch so that the paper feed mechanism operates to deliver a sheet of paper.

The paper feed belts 42 are driven from their pulleys 73 carried by the shaft 74 which is connected by the gears 75 to a shaft 76 in turn connected by the gears 77 to the cam shaft 45. With this control means the paper is, as stated, fed only when articles are being fed into the machine by the feed conveyer and its feed is properly timed through the connections described. The slide 70 is operated by the lever 78 pivoted on the bracket 79 oscillated by the link 80 controlled by the cam 81 on the cam shaft 45. The details of this cam are not illustrated as the requirements will be readily understood.

As stated, the articles are delivered by the shifting plunger 40 to the feed plunger 39 which is provided with a slide 82 mounted on the vertical slide way 83. This plunger 39 is connected by the link 39' to the operating lever 84 pivoted at 85 and oscillated by the pitmen 86 from the cam 87 on the cam shaft 45, thus operating the feed plunger in proper synchronism with the shifting plunger and the paper feed mechanism.

The feed plunger carries the article to be wrapped upwardly between the end of the conveyer way 6 and the wrapping member 88, the movement of which is timed so that when the plunger 39 begins on its return movement the wrapping member 88 moves forward under the article carrying the portion 89 of the wrapper 90 forwardly under the article until the article is engaged by the pusher 91 when the article and wrapper are shoved forwardly upon the way 6 which forms the wrap 92 (see Figs. XIII and XV). The wrapping member 88 is operated by the lever 93 which is connected by the link 94 to an arm 95 on the rock shaft 96. This rock shaft is oscillated by means of the cam 97 on the cam shaft 45 which has a cam groove 98 engaging a roller 99 on the arm 100 of the rock shaft (see Figs. I and XI).

The next step in the wrapping is performed by the tucking folder member 101 which is supported for reciprocating movement and adapted to tuck or push the wrapper bottom flaps 102 into the slot 103 of the folder member 104 which is disposed oppositely to the folder member 101 (see Fig. XIII). This operation folds the flaps 102 upon themselves, as shown at 105 (see Fig. XVI). The tucking folder 101 is operated by the lever 146 which is connected by the link 147 to an arm 148 on the rock shaft 96.

The next operation is to turn the double fold 105 to the position shown at 106 (see Fig. XVII). This is accomplished by the rocking of the folder member 104 on its pivot 107, it being given a half turn so that when its movement is completed it faces rearwardly, in which position the completed bottom fold is drawn therefrom as the article is engaged by the sealing conveyer flights and carried upon the conveyer way. It will be understood that the operating connections for mechanisms are such that they are operated in proper sequence. The pivot 107 is provided with a pinion 108 driven by the oscillating gear or segment 109 journaled at 110 and having an arm or crank 111 connected by the link 112 to the actuating lever 113 (see Fig. XIV). This actuating lever is operated by the cam 114 on the cam shaft 45.

Where the wrapper is to be sealed, as in the structure illustrated, it is of paraffin paper and a heater 115 is disposed under the conveyer way 106 at the rear of the folder member 104. As the article is carried over this heater the fold or seam of the wrapper is heated sufficiently to cause the paraffin to seal it. The fold or seam when thus formed is of sufficient thickness to support the article, such as a loaf of bread, out of contact with the hot face above the heater, which is a desirable feature, as heating of the loaf, as by passing over a hot plate or surface, is objectionable. As the article is carried along by the sealing conveyer its bottom and rear end flaps are engaged by the rotating folders 116 having blades or fingers 117 and 118. These folders 116 are mounted on the shaft 119 and their rotation is timed so that as the article is carried along the portions of the wrapper constituting the end folds or flaps are engaged and folded by the front fingers or blades 117 of the folders and the portion constituting the rear folder flaps are engaged and folded by the rear fingers 118. These folders are driven at a speed somewhat greater than that of the conveyer, which secures the desired folding. These folders are substantially the same as the corresponding folders described and claimed in my said application. The folder shaft 119 is connected by the gears 120 to the shaft 121, which is, in turn, connected to the cam shaft 45 by the chain 122 and suitable sprockets.

The portions of the wrapper constituting front end flaps are engaged by the side plates 123 as the articles are carried along by the conveyer and folded backwardly upon the end flaps previously folded, as described. The portions of the wrapper constituting top end flaps are then folded by the vertically reciprocating folders 124 carried by the slides 125 and disposed to fold the top end flaps down on the outer sides of the plates 123, so that as the articles are carried forward these top flaps pass between the inwardly converged ends 126 of these plates and the heaters 127 (see Fig. XVIII).

The folders 124 are connected by the pitmen 128 to the actuating cams 129 on the cam shaft 45. The lower ends of the pitmen 128 are supported in operative relation to the cams by the links 130. After the top end flaps are folded they are carried between the plates 123 and the heater 127 which melts the paraffin sufficiently so that as they pass from these plates between the flap pressing and article delivery belts 131 the end flaps are properly sealed. By delivering the top flaps between the plates 123 and the heater the article itself is protected from injurious heating.

The flap pressing and delivery belts 131 are supported on vertical pulleys 132 and 133 carried by a sub-frame on the main frame. One of the pulleys 132 is driven from the shaft 134 provided with a beveled pinion or gear 135 meshing with the gear 136 on the shaft 18. The upper end of the shaft 134 is connected by the sprocket chain 137 and suitable sprockets to the inner pulley 132. The other pulley 132 is connected by the chain 138 and suitable sprockets to the vertical shaft 13 described in connection with the driving means for the sealing conveyer.

The driving connections from the driving shaft 4 are controlled by the clutch mechanism 139 operated from the rock shaft 140 extending longitudinally of the frame and having an arm 141 at its front end connected by the link 142 to the lower end of the control lever 143 (see Figs. III and IV). The articles are delivered from the belts on to a slide or table 144, the inner end of which is supported by a brace or bracket 145. This delivery table 144 may be in the form of a chute or otherwise, as desired.

My improved wrapping and sealing machine is quite compact and at the same time is of large capacity and is entirely automatic in its operation.

I have illustrated and described my improvements with considerable detail in the form in which I have embodied the same. I have not attempted to illustrate or describe various modifications in structural details which I contemplate or which might be desirable in embodying my improvements for particular uses, as I believe the disclosure made will enable those skilled in the art to which my invention relates to embody or adapt the same as may be desired. I desire, however, to be understood as claiming my improvements specifically in the form illustrated as well as broadly within the scope of the appended claims.

Having thus described my invention, what I claim as new and desire to secure by Letters Patent, is:

1. In a structure of the class described, the combination of a sealing conveyer, a wrapper feed means, means for wrapping a wrapper about the sides of an article, rotary folders disposed at the sides of the way and provided with pairs of fingers adapted to successively fold the bottom and rear end flaps, plates between which the articles are carried adapted to fold the front end flaps, said plates being disposed so that the top end flaps project over the same, reciprocating folder members adapted to fold the top end flaps downwardly at the outside of said plates, means for heating said top end flaps while they are separated from the article by said plates, and means for pressing said heated flaps upon the other end flaps.

2. In a structure of the class described, the combination of a sealing conveyer, a wrapper feed means, means for wrapping a wrapper about the sides of an article, means for folding the bottom and rear end flaps, plates between which the articles are carried adapted to fold the front end flaps, said plates being disposed so that the top end flaps project over the same, means for folding the top end flaps on the outside of said plates, means for heating said top end flaps while they are separated from the article by said plates, and means for pressing said heated flaps upon the other end flaps.

3. In a structure of the class described, the combination of a sealing conveyer, a wrapper feed means, means for wrapping a wrapper about the sides of an article, means for folding the bottom and rear end flaps, plates between which the articles are carried adapted to fold the front end flaps, said plates being disposed so that the top end flaps project over the same, means for folding and heating the top end flaps on the outside of said plates.

4. In a structure of the class described, the combination of a sealing conveyer comprising a conveyer way and coacting propelling flights, a feed conveyer disposed transversely to and in a plane below said sealing conveyer, a vertically reciprocating feed plunger disposed at the side of said feed conveyer to deliver to said sealing conveyer, a shifting plunger for transferring the articles from said feed conveyer to said feed plunger, means for delivering a wrapper between said sealing conveyer and said feed plunger disposed so that it is engaged by the article to be wrapped on the delivery stroke of said feed plunger, means for controlling the delivery of wrappers including said shifting plunger and a coacting member actuated by the articles delivered by the feed conveyer, a reciprocating wrapping member disposed when in initial position in a spaced relation to the end of said sealing conveyer and so that the article is carried between it and the end of the conveyer way and the wrapper wrapped over the top and against the sides of the article, and means for actuating said wrapping member wrapping one side of the wrapper partially across the bottom of the article, said wrapping member being provided with a pusher disposed in a spaced relation to the edge of the wrapping member to engage the article and push it partially upon the conveyer way wrapping the other side of the wrapper partially across the bottom thereof.

5. In a structure of the class described, the combination of a sealing conveyer comprising a conveyer way and coacting propelling flights, a feed conveyer disposed transversely to and in a plane below said sealing conveyer, a vertically reciprocating feed plunger disposed at the side of said feed conveyer to deliver to said sealing conveyer, a shifting plunger for transferring the articles from said feed conveyer to said feed plunger, means for delivering a wrapper between said sealing conveyer and said feed plunger disposed so that it is engaged by the article to be wrapped on the delivery stroke of said feed plunger, means for controlling the delivery of wrappers including said shifting plunger and a coacting member actuated by the articles delivered by the feed conveyer, a reciprocating wrapping member disposed when in initial position in a spaced relation to the end of said sealing conveyer and so that the article is carried between it and the end of the conveyer way and the wrapper wrapped over the top and against the sides of the article, and means for actuating said wrapping member wrapping one side of the wrapper under the article.

6. In a structure of the class described, the combination of a conveyer comprising a conveyer way, means for wrapping a wrapper about an article forming a side fold in said wrapper and delivering the article and wrapper upon said way with the fold spacing the article from said way, means for heating a portion of said conveyer way, means for moving the article and wrapper along said way, means for folding the front, rear and bottom end flaps of said wrapper, means for folding the top end flaps of said wrapper downwardly, means for heating said top end flaps, means for spacing said top end flaps from said folded end flaps while being heated, and means for pressing the heated end flaps against the folded end flaps, in the order named.

7. In a structure of the class described, the combination of a conveyer comprising a conveyer way, means for wrapping a wrapper about an article and forming a side fold in said wrapper and delivering said article and wrapper upon said way, means for moving said article and wrapper along said way, and means for folding the end flaps of said wrapper while said article and wrapper are being moved along said way comprising means for heating one of said end flaps after it has been folded, means for spacing said end flap from the other end flaps while being heated, and means for pressing said heated end flaps against the other end flaps in the order named, substantially as described.

8. In a structure of the class described, the combination of means for wrapping a wrapper about an article to form a tubular container, means for forming and folding end flaps at the ends of the said tubular container, means for heating one of said end flaps after it has been formed and folded but while it is spaced from the previously formed and folded end flaps, and means for pressing said heated end flaps against the previously folded end flaps, in the order named, as specified.

In witness whereof, I have hereunto set my hand and seal in the presence of two witnesses.

HARRY L. JOHNSON. [L. S.]

Witnesses:
BERNARD J. ONEN,
THERESA F. GIBBONS.